United States Patent
Konings

[11] Patent Number: 6,040,957
[45] Date of Patent: Mar. 21, 2000

[54] DISK DRIVE DISK DAMPER

[75] Inventor: John Konings, Milpitas, Calif.

[73] Assignee: Quantum Corporation, Milpitas, Calif.

[21] Appl. No.: 08/868,190

[22] Filed: Jun. 3, 1997

[51] Int. Cl.⁷ .................................................. G11B 17/028
[52] U.S. Cl. ..................................... 360/98.08; 360/99.12
[58] Field of Search .............................. 360/97.01, 97.02, 360/97.03, 98.08, 99.05, 99.12; 369/263

[56] References Cited

U.S. PATENT DOCUMENTS

| | | | |
|---|---|---|---|
| 4,764,828 | 8/1988 | Gollbach | 360/98.08 |
| 5,436,775 | 7/1995 | Ishimatsu | 360/98.08 |
| 5,590,004 | 12/1996 | Boutaghou | 360/99.12 |
| 5,644,451 | 7/1997 | Chan et al. | 360/105 |
| 5,663,851 | 9/1997 | Jeong et al. | 360/98.08 |

FOREIGN PATENT DOCUMENTS 3-268245   11/1991   Japan .

*Primary Examiner*—William R. Korzuch
*Attorney, Agent, or Firm*—Nydegger & Associates

[57] ABSTRACT

A disk separator for a disk assembly of a disk drive is provided herein. The disk assembly includes a plurality of storage disks which are spaced apart on a spindle by a plurality of the disk separators. As provided herein, each disk separator includes a disk spacer and a disk damper which extend between adjacent storage disks. The disk spacer is rigid and maintains the relative position of the storage disks in the disk assembly. The disk damper is elastic and significantly reduces the vibration level of the storage disks in the disk assembly. The reduced vibration level decreases the level of mis-registration which occurs during operation of the disk drive and allows for the use of high rotational speed, high density, storage disks. Additionally, the disk assembly can include an end separator for separating the storage disks from a first stop or a second stop on the spindle. The end separator includes an end spacer and an end damper which extend between one of the surfaces of the storage disk and one of the stops.

15 Claims, 3 Drawing Sheets

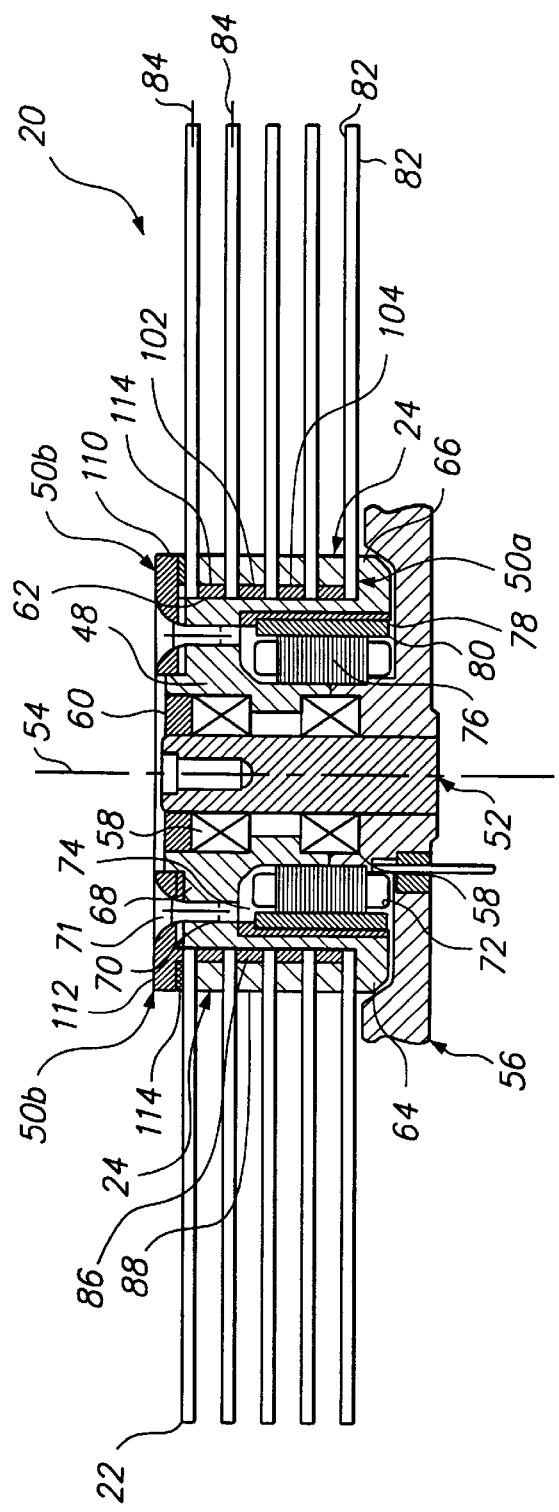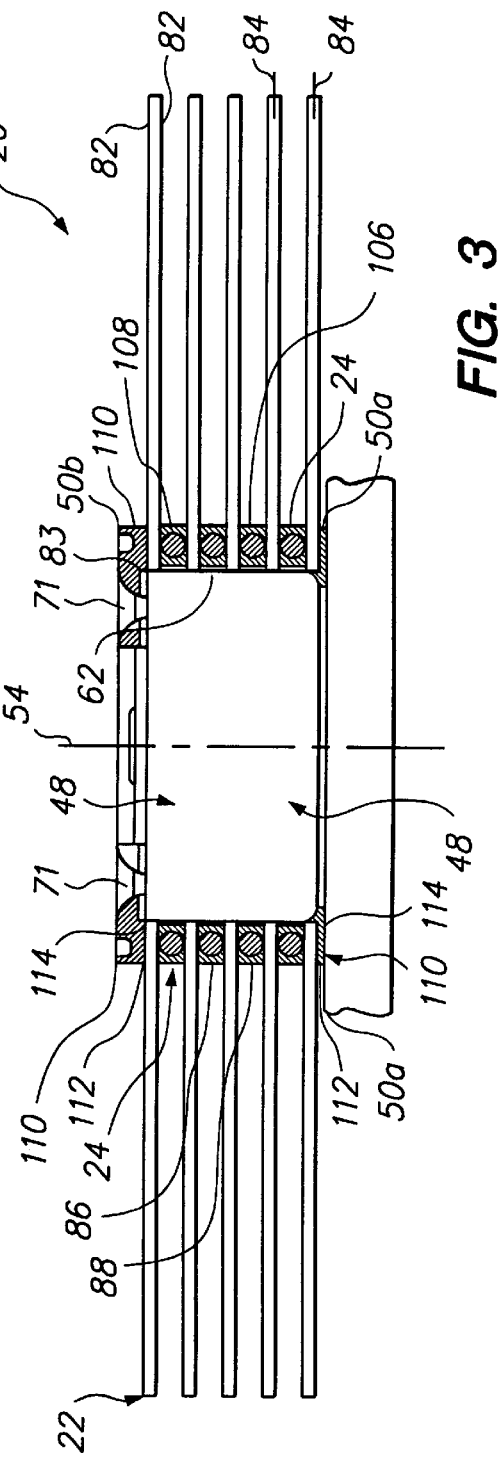

DISK DRIVE DISK DAMPER

FIELD OF THE INVENTION

The present invention relates generally to disk drives for storing data. More specifically, the present invention relates to a disk separator for dampening vibration in rotating storage disks of a disk drive.

BACKGROUND

Disk drives are widely used in computers and data processing systems for storing information. These disk drives commonly use magnetic storage disks to store data in digital form. In order to obtain higher storage capacities, disk drives have evolved from utilizing a single rotating, storage disk, to utilizing a plurality of spaced apart, rotating, storage disks.

Each storage disk typically includes a data storage region on each surface of the storage disk. These storage surfaces are divided into a plurality of narrow, annular, concentric regions of different radii, commonly referred to as "tracks." Typically, an actuator assembly is used for precisely positioning a data transducer proximate the appropriate track on the storage disk to transfer information to and from the storage disk.

The need for increased storage capacity and compact construction of the disk drive has led to the use of smaller disks having increased track density, i.e., more tracks per inch. With these systems, the accurate and stable positioning of the data transducer proximate the appropriate track is critical to the accurate transfer and/or retrieval of information from the rotating storage disks.

As is well known in the art, the rotating storage disks are excited by internal and external vibration of the disk drive. This vibration causes axial motion in the rotating disks. Unfortunately, some of this axial motion is transferred to the data transducers. This can lead to errors in the transfer of data caused by the inaccurate positioning of the data transducer relative to the tracks on the rotating disks. This is commonly referred to as "track mis-registration."

Moreover, the need to rapidly access information has led to disk drives having storage disks which are rotated at ever increasing speeds. Presently, disk drives having disks which rotate at about 7,200 RPM are currently available. However, high speed disk drives which rotate at 10,000 RPM or more RPM are presently being designed. Regrettably, a significant portion of the internal vibration can be attributed to wind effect on the rotating disks. Thus, the increased rotational speed of the storage disks often results in increased levels of vibration of the rotating disks and increased occurrences of track mis-registration.

One attempt to solve this problem includes changing the design of each storage disk to reduce the amplitude of the vibration. For example, prototype storage disks have been made which utilize a pair of disk shaped aluminum substrates, that are separated by a viscous material. However, these disks have proven to be expensive to manufacture and the dimensions of these disks fluctuate significantly with temperature changes.

Another attempt to solve this problem includes positioning an elastic ring in series with a rigid spacer between adjacent disks. However, this attempt has also proven to be unsuccessful because compression in the elastic ring allows for movement of the storage disks. This leads to track mis-registration.

In light of the above, it is an object of the present invention to provide a disk assembly for a disk drive having reduced levels of vibration. Another object of the present invention is to provide a more stable and accurate disk drive. Still another object of the present invention is to provide a disk drive which utilizes a plurality of high speed, high density storage disks.

SUMMARY

The present invention is directed to a disk separator for a disk assembly of a disk drive which satisfies these objectives. As described in detail below, the disk separator includes a disk spacer and a disk damper which extend between two (2) storage disks on a spindle of the disk assembly. The disk spacer accurately maintains the distance between the storage disks, while the disk damper dampens the vibration in the storage disks. The reduced vibration of the storage disks allows for more accurate and stable positioning of data transducers proximate the storage disks. This leads to more accurate transferal of data to and from the storage disks and less track mis-registration.

The disk spacer and the disk damper each extend substantially between adjacent surfaces of the two (2) storage disks. The disk spacer is substantially rigid to maintain the two (2) storage disks spaced apart on the spindle, while the disk damper is substantially elastic. Typically, the disk spacer and the disk damper are substantially annular and substantially encircle the spindle. Preferably, the disk damper and the disk spacer are substantially concentric to maintain the balance of the disk assembly.

The positioning of the disk damper relative to the disk spacer can vary. For example, the disk damper can encircle the disk spacer. In this embodiment, the disk damper has a disk damper outer diameter which is larger than a disk spacer outer diameter of the disk spacer. Alternately, for example, the disk spacer can encircle the disk damper. In this embodiment, the disk spacer outer diameter is larger than the disk damper outer diameter.

Preferably, the disk damper has a disk damper height which is larger than a disk spacer height of the disk spacer. This is preferred so that the disk damper is initially under a compressive load to dampen the vibration of the storage disks. Typically, the disk damper height is between approximately 0.003 millimeters to 0.2 millimeters larger than the disk spacer height.

Typically, the spindle includes a first stop, commonly referred to as a hub flange, and a second stop, commonly referred to as a disk clamp, for retaining the storage disks on the spindle. As provided herein, an end separator can be used to separate one (1) of the storage disks from one (1) of the stops. Somewhat similar to the disk separator, the end separator includes an end spacer and an end damper. The end spacer and end damper each extend substantially between one (1) of the surfaces of the storage disk and one (1) of the stops. The end spacer is substantially rigid and maintains the storage disk spaced apart from the stop. The end damper is substantially elastic and dampens the level of vibration in the storage disk.

The disk separator and the end separator provided herein are particularly suited for disk drives having a plurality of spaced apart disks which rotate at greater than approximately 7,000 RPM. Further, the disk separator and end separator are particularly suited for disk drives with storage disks having a relatively high track density, i.e., between approximately 8,000 to 14,000 or more tracks per inch.

The present invention is also directed to a method for damping the level of vibration of at least one rotating storage disks. The method includes the steps of: (i) maintaining two (2) storage disks spaced apart with a disk spacer which extends between the storage disks; and (ii) dampening vibration in the storage disks with a substantially elastic disk damper which extends between the storage disks.

Importantly, the unique design of the disk separator and end separator reduce the vibration of rotating storage disks in a disk drive. This results is a more efficient, stable and accurate disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2 is a cross-sectional view of a first embodiment of a disk assembly having features of the present invention;

FIG. 3 is a cross-sectional view of a second embodiment of a disk assembly having features of the present invention;

DESCRIPTION

Figure 1:
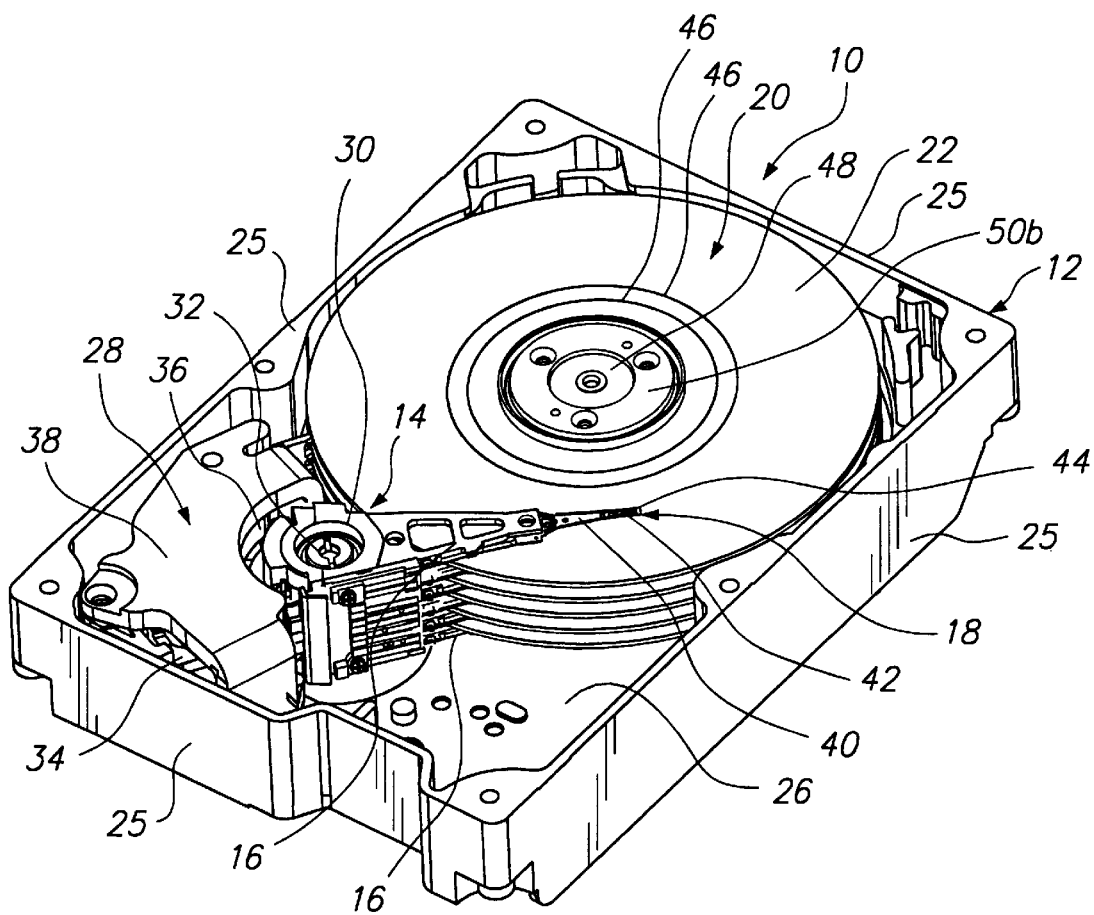
FIG. 1 is a perspective view of a disk drive having features of the present invention, a top cover from the disk drive has been removed for clarity.

Referring initially to FIG. 1, a disk drive 10 according to the present invention includes: (i) a drive housing 12; (ii) an actuator assembly 14 which includes a plurality of actuator arms 16; (iii) a plurality of transducer assemblies 18; and (iv) a disk assembly 20 which includes a plurality of rotating storage disks 22 which are spaced apart by disk separators 24 (not shown in FIG. 1). As provided in detail below, the disk separators 24 dampen the vibration in the rotating storage disks 22. This allows for more accurate positioning of the transducer assemblies 18 and more accurate data transfer to and from the storage disks 22.

A detailed description of the various components of a disk drive 10 is provided in U.S. Pat. No. 5,208,712, issued to Hatch et al. and assigned to Quantum Corporation, the assignee of the present invention. The contents of U.S. Pat. No. 5,208,712 are incorporated herein by reference. Accordingly, only the structural aspects of a disk drive 10 which are particularly significant to the present invention are provided herein.

The drive housing 12 retains the various components of the disk drive 10. The drive housing 12, shown in FIG. 1, includes four (4) side walls 25 and a base 26. A typical drive housing 12 also includes a cover (not shown for clarity) which is spaced apart from the base 26 by the side walls 25. The drive housing 12 is typically installed in the case of the computer (not shown) or a word processor (not shown).

The actuator assembly 14 includes the plurality of actuator arms 16 for retaining the transducer assemblies 18 proximate the storage disks 22 and a voice coil motor 28. In the embodiment shown in FIG. 1, the actuator arms 18 are attached to and cantilever from an actuator hub 30. In this embodiment, the actuator hub 30 is mounted to an actuator shaft 32 and rotates relative to the actuator shaft 32 on an actuator bearing assembly (not shown).

The voice coil motor 28 precisely moves the actuator arms 16 and the transducer assemblies 18 relative to the storage disks 22. The voice coil motor 28 can be implemented in a number of alternate ways known by those skilled in the art. For example, the voice coil motor 28 can be a rotary voice coil motor or a linear voice coil motor. In the embodiment shown in FIGS. 1, the voice coil motor 28 is a rotary voice coil motor. In this embodiment, activation of the voice coil motor 28 rotates the actuator hub 30 and moves the actuator arms 16 relative to the storage disks 22.

As can best be seen in FIG. 1, the rotary voice coil motor 28 can include a coil 34 that is attached to the actuator hub 30. The coil 34 is disposed between a pair of spaced apart permanent magnets 36 (only one (1) magnet 36 is shown) and a pair of spaced apart flux return plates 38 (only one (1) flux return plate 38 is shown) which are secured to the drive housing 12.

The magnets 36 have pole faces of opposite polarity directly facing opposite legs of the coil 34. The resultant magnetic fields are such that current passing through the coil 34 in one (1) direction causes rotation of the actuator hub 30 in one (1) radial direction relative to the disks 22 (such as the radially outward direction) while reverse current causes reverse direction movement (such as the radially inward direction). Thus, the voice coil motor 28 is able to bi-directionally rotate the actuator hub 30 relative to the drive housing 12.

The transducer assemblies 18 transfer or transmit information between the computer or word processor and the storage disks 22. In the embodiment provided herein, each transducer assembly 18 includes a load beam 40, a flexure 42, and a data transducer 44. The load beam 40 attaches the flexure 42 and the data transducer 44 to the actuator arm 16. Typically, each load beam 40 is flexible in a direction perpendicular to the storage disk 22 and acts as a spring for supporting the data transducer 44. As the disks 22 rotate, air flow between each data transducer 44 and the respective storage disk 22 causes the data transducer 44 to ride at an aerodynamically stabilized distance from the storage disk 22. Each load beam 40 is resilient and biased to urge each data transducer 44 towards the respective storage disk 22.

Each flexure 42 is used to attach one (1) of the data transducers 44 to one (1) of the load beams 40. Typically, each flexure 42 includes a plurality of conductive flexure traces (not shown) which are electrically connected to the data transducer 44.

Each data transducer 44 interacts with one (1) of the storage disks 22 to access or transfer information to the storage disk 22. For a magnetic storage disk 22, the data transducer 44 is commonly referred to as a read/write head. To read or access data from a magnetic storage disk 22, the data transducer 44 produces electronic read signals in response to the passage of tracks 46 on the storage disk 22. To write or transfer data to the disk 22, the data transducer 44 generates a magnetic field which is capable of polarizing the desired region of the storage disk 22.

It is anticipated that the present device can be utilized for data transducers 44 other than read/write heads for a magnetic storage disk 22. For example, the present invention may be used with an electro-optical or magneto optical transducer for accessing data stored on optical or magneto-optical storage disk.

Referring now to FIG. 2, the disk assembly 20 includes a spindle 48, the plurality of storage disks 22 and the plurality of disk separators 24. As detailed herein, the disk separators 24 provide dimensional stability to the spaced apart storage disks 22 and reduced vibrational amplitude in the storage disks 22.

The design of the spindle 48 can vary according to the design of the other components of the disk drive 10. As shown in FIG. 2, the spindle 48 includes a hub flange 50a and a disk clamp 50b which secure the storage disks 22 and disk separators 24 to the drive housing 12. The spindle 48 is mounted to a spindle shaft 52 which is secured to a base plate 56. The spindle 48 rotates on a disk axis 54 relative to the spindle shaft 52 on a spindle bearing assembly 58.

The shape of the spindle 48 can vary according to the design of the other components of the disk drive 10. For example, the spindle 48, shown in FIG. 2, is somewhat annular ring shaped and includes a spindle inner surface 60 for receiving the spindle bearing assembly 56 and a spindle outer surface 62 for receiving the storage disks 22 and the disk separators 24. A lower end 64 of the spindle 48 includes a circumferential outwardly protruding lip 66 which forms the hub flange 50a for inhibiting downward movement of the storage disks 22. An upper end 68 of the spindle 48 includes a plurality of internally threaded surfaces 70 for attaching the disk clamp 50b to the spindle 48.

In the embodiment shown in the FIGS. 2 and 3, the disk clamp 50b is disk shaped and is secured to the spindle 48 with a plurality of spindle bolts 71. The spindle bolts 71 insert into the internally threaded surfaces 70 and draw the disk clamp 50b downward to clamp the storage disks 22 and the disk separators 24 together.

The spindle 48, the storage disks 22, the disk separators 24, the hub flange 50a and the disk clamp 50b are rotated about the disk axis 54 at a predetermined angular velocity by a spindle motor 72. In the embodiment shown in FIG. 2, the spindle motor 72 is positioned in a spindle cavity 74 which is formed between the spindle 48 and the base plate 56. The spindle motor 72 includes a stator 76 which is secured to the base plate 56, and a back iron 78, and a magnet 80 which are secured to the spindle 48.

The rotation rate of the spindle motor 72 varies according to the design of the disk drive 10. Presently, disk drives 10 utilize storage disks 22 rotated at an angular velocity of about 7,200 RPM. However, the present invention is particularly suited for use with disk drives 10 having storage disks 22 which rotate between about 7,000 RPM to 10,000 RPM. It is anticipated that technological advances will allow for disk drives 10 which rotate at higher speeds, such as about 14,000 or more RPM.

The storage disks 22 store data in a form that can be subsequently retrieved if necessary. Magnetic storage disks 22 are commonly used to store data in digital form. Alternately, for example, each storage disk 22 can be optical or magneto-optical. For conservation of space, each storage disk 22 preferably includes a data storage region on each surface 82 of the storage disk 22. Each data storage region is typically divided into a plurality of narrow annular regions of different radii, commonly referred to as "tracks" 46. The two (2) tracks 46, shown in FIG. 1, are representative of the plurality of tracks 46 which are located on each surface 82 of the storage disk 22.

Importantly, because the disk separators 24 reduce the vibration level in the disk assembly 20 and allow for more stable and accurate positioning of the transducer assemblies 18, the track densities of the disks 22 can be relatively high. Preferably, for conservation of space, each disk 22 has a track density of at least approximately 4,500 tracks per inch, more preferably at least approximately 8,500 tracks per inch and even more preferably at least approximately 14,000 tracks per inch.

Each storage disk 22 includes a disk opening 83 which is sized to fit over the spindle outer surface 62. The storage disks 22 are manufactured by ways known to those skilled in the art. For high speed, high track density storage disks 22, surface flatness and finish of each storage disk 22 is particularly important to the dynamic stability of the disk drive 10 and the interaction between each data transducer 44 and each data storage surface.

The embodiments shown in FIGS. 2 and 3 include five (5) spaced apart storage disks 22 which are attached to the spindle 48. Those skilled in the art will recognize that the present invention is useful for disk drives 10 having any number of spaced apart storage disks 22. For example, the disk drive 10 can include six (6), nine (9), or twelve (12) storage disks 22.

Adjacent storage disks 22 are spaced apart a sufficient distance so that at least one (1) data transducer 44 can be positioned proximate each of the surfaces 82 of adjacent storage disks 22. Typically, a centerline 84 of consecutive disks 22 is spaced apart between about one millimeters (1 mm) to three millimeters (3 mm).

The disk separator 24 encircles the spindle 48 and properly maintains the distance between adjacent storage disks 22. The number of the disk separators 24 varies according to the number of disks 22. For example, the disk drive 10, shown in FIG. 2, includes five (5) storage disks 22 and four (4) disk separators 24. Alternately, for example, a disk drive 10 which includes seven (7) storage disks 22 can utilize six (6) disk separators 24.

As shown in FIGS. 2–7, each disk separator 24 includes a disk spacer 86 and a disk damper 88 which are sized to encircle the spindle 48. The disk spacer 86 extends between adjacent storage disks 22 to accurately maintain the distance or spacing between adjacent disks 22. The disk damper 88 extends between adjacent storage disks 22 to dampen vibration between adjacent disks 22.

Figure 4:
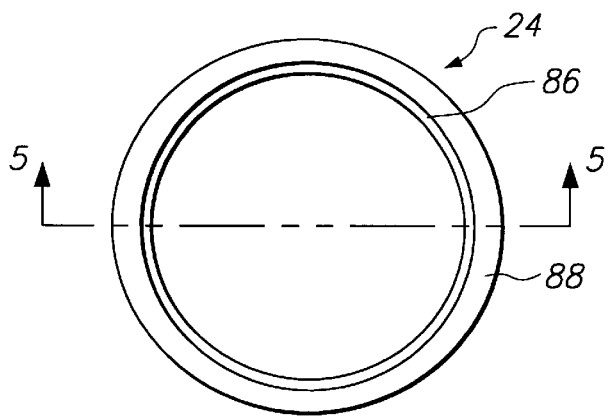
FIG. 4 is a top plan view of a first embodiment of a disk separator having features of the present invention.
Figure 5:
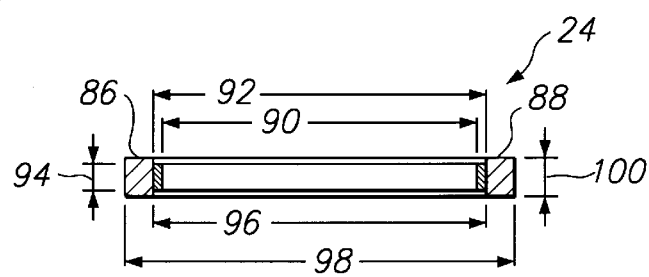
FIG. 5 is a cross-sectional view of the disk separation of FIG. 4 taken on line 5—5.
Figure 6:
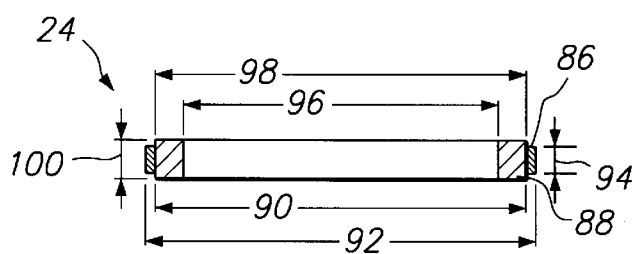
FIG. 6 is a cross-sectional view of a second embodiment of a disk separator having features of the present invention.
Figure 7:
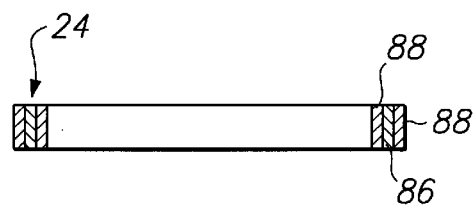
FIG. 7 is a cross-sectional view of a third embodiment of a disk separator having features of the present invention.

As can best be seen in FIG. 4, the disk spacer 86 is substantially annular or ring shaped. Each disk spacer 86 is substantially rigid and can be made from a number of materials such as aluminum, an aluminum alloy, or a magnesium alloy. Referring now to FIGS. 5 and 6, each disk spacer 86 includes a disk spacer inner diameter 90, a disk spacer outer diameter 92 and a disk spacer height 94.

Referring back to FIG. 4, the disk damper 88 is also substantially annular or ring shaped. The disk damper 88 is substantially elastic and can be made from a number of elastic materials. A suitable material for the disk damper 88 includes an elastomer sold by DuPont located in Wilmington, Del. under the trade name "Viton." "Viton" exhibits a number of excellent properties including: (i) being inert; (ii) having a low set resistance; and (iii) having the ability to operate over a wide range of temperatures.

Referring to FIGS. 4 and 5, the disk damper 88 includes a disk damper inner diameter 96, a disk damper outer diameter 98, and a disk damper height 100 which can vary according to the design of the disk drive 10.

The design of the disk separator 24 can vary. For example, in the embodiment shown in FIGS. 2, 41 and 5, the disk spacer 86 is positioned on the inside of the disk damper 88.

In this embodiment, the disk spacer outer diameter 92 is less than the disk damper outer diameter 98. Alternately, as shown in FIGS. 3 and 6, the disk damper 88 can be positioned on the inside of the disk spacer 86. In this embodiment, the disk damper outer diameter 98 is less than the disk spacer outer diameter 92. In another alternate embodiment shown in FIG. 7, the disk spacer 86 is positioned between a pair of disk dampers 88.

Typically, disk damper height 100 and the disk spacer height 94 are sized so that the centerline 84 of consecutive disks 22 is spaced apart between about one millimeters (1 mm) to three millimeters (3 mm). Preferably, the disk damper height 100 is slightly larger than the disk spacer height 94 so that the disk damper 88 is initially partly compressed. The amount of compression can be varied to suit the needs of the disk drive 10. Typically, the disk damper height 100 is at least between approximately 0.003 millimeters to 0.2 millimeters larger than the disk spacer height 94.

Preferably, the disk damper 88 and the disk spacer 86 are secured together for ease of assembly of the disk assembly 20. This can be accomplished in a number of alternate ways. For example, the disk damper 88 can be molded to the disk spacer 86 or the disk damper 88 can be adhered with an adhesive to the disk spacer 86. Alternately, as shown in FIG. 2, the disk damper 88 can include a damper circumferential groove 102 for receiving a spacer circumferential ring 104 on the disk spacer 86. Alternately, as shown in FIG. 3, the disk spacer 86 can include a spacer circumferential groove 106 for receiving a damper circumferential ring 108 on the disk damper 88.

The disk assembly 20 can also include end separators 110 for additionally minimizing vibration in the disk assembly 20. Referring back to FIGS. 2 and 3, the end separators 110 separate one of the storage disks 22 from the hub flange 50*a* and one of the storage disks 22 from the disk clamp 50*b*.

Figure 8:
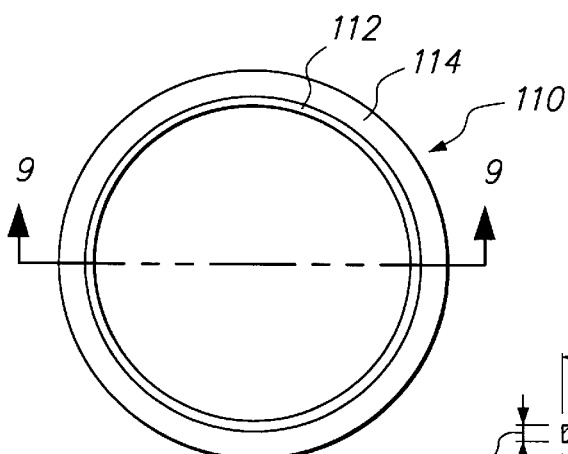
FIG. 8 is a top plan view of a first embodiment of an end separator having features of the present invention.
Figure 9:
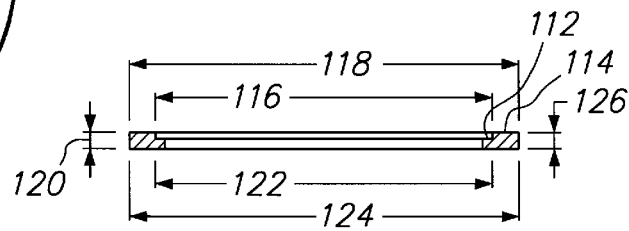
FIG. 9 is a cross-sectional view of the end separator taken on line 9—9 of FIG. 8.

As can best be seen in FIGS. 8 and 9, each end separator 110 includes an end spacer 112 and an end damper 114. The end spacer 112 maintains the storage disk 22 spaced apart from one of the stops 50*a*, 50*b* on the spindle 48 and extends between one (1) of the surfaces 82 of the storage disk 22 and one (1) of the stops 50*a*, 50*b*. The end spacer 112 is substantially annular or ring shaped. Each end spacer 112 is substantially rigid and can be made from a number of materials such as aluminum, an aluminum alloy, or a magnesium alloy.

As shown in FIGS. 2 and 3, the end spacer 112 can be an integral part of the hub flange 50*a* or the disk clamp 50*b*. Alternately, as shown in FIGS. 8 and 9, the end spacer can be separate ring which is attached to the end damper 114. As shown in FIG. 9, each end spacer 112 includes an end spacer inner diameter 116, an end spacer outer diameter 118 and an end spacer height 120.

The end damper 114 is substantially elastic and also extends between one (1) of the surfaces 82 of the storage disks 22 and one of the stops 50*a*, 50*b*. Referring back to FIG. 8, the end damper 114 is also substantially annular or ring shaped. The end damper 114 is substantially elastic and can be made from a number of elastic materials. A suitable material for the end damper 114 is the elastomer sold by DuPont under the trade name "Viton." As shown in FIG. 9, the end damper 88 includes an end damper inner diameter 122, an end damper outer diameter 124, and an end damper height 126.

The design of the end separator 110 can vary. For example, in the embodiment shown in FIGS. 2, 8, and 9, the end spacer 112 is positioned on the inside of the end damper 114. In this embodiment, the end spacer outer diameter 118 is less than the end damper outer diameter 124. Alternately, as shown in FIGS. 3 the end damper 114 can be positioned on the inside of the end spacer 112. In this embodiment, the end damper outer diameter 124 is less than the end spacer outer diameter 118.

The end damper height 126 is preferably larger than the end spacer height 120 so that the end damper 114 is initially partly compressed. The amount of compression can be varied to suit the needs of the disk drive 10. Typically, the end damper height 126 is at least between approximately 0.003 millimeters to 0.2 millimeters larger than the end spacer height 120.

While the particular disk drive 10 and disk assembly 20 as herein shown and disclosed in detail are fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A disk separator for separating two storage disks on a spindle of a disk drive, each storage disk having two sides, the disk separator comprising:

a disk spacer adapted for extending between one of the sides of each of the two storage disks and maintaining the two storage disks spaced apart a fixed, disk distance on the spindle, the disk spacer having a disk spacer height; and a substantially elastic disk damper adapted for extending between one of the sides of each of the two storage disks and dampening the level of vibration in the storage disks, the disk damper having a disk damper height which is larger than the disk spacer height;

wherein the disk damper is substantially annular and is adapted for substantially encircling the spindle, and the disk spacer is substantially annular and is adapted for substantially encircling the spindle;

wherein the disk damper and the disk spacer are substantially concentric; and wherein the disk damper has a disk damper outer diameter which is larger than a disk spacer outer diameter of the disk spacer, and the disk damper and the disk spacer are secured together.

2. The disk separator of claim 1 wherein the disk damper height is between approximately 0.003 millimeters to 0.2 millimeters larger than the disk spacer height.

3. The disk separator of claim 1 wherein the disk spacer is substantially rigid.

4. A disk assembly including the disk separator of claim 1 positioned between the two storage disks.

5. The disk assembly of claim 9 comprising the spindle, a first stop attached to the spindle, a second stop attached to the spindle, and an end separator separating one of the storage disks from one of the stops, the end separator comprising: (i) an end spacer extending between one of the sides of the storage disk and one of the stops; and (ii) a substantially elastic, end damper extending between one of the sides of the storage disk and one of the stops.

6. A disk drive comprising the disk assembly of claim 4.

7. A disk drive comprising the disk assembly of claim 4 and a spindle motor which is adapted for selectively rotating the disk assembly at an angular velocity which is greater than about 7,000 RPM.

8. A method for damping the vibration of two spaced apart, rotating storage disks positioned on a spindle of a disk drive, each storage disk having two sides, the method comprising the steps of:

maintaining the storage disks spaced apart a fixed, disk distance with a disk spacer which extends between one of the sides of each of the two storage disks, the disk spacer having a disk spacer height; and dampening vibration in the storage disks with a substantially elastic disk damper which extends between one of the sides of each of the two storage disks, the disk damper being substantially concentric with the disk spacer, the disk damper having a disk damper height which is larger than the disk spacer height, the disk damper having a disk damper outer diameter which is larger than a disk spacer outer diameter of the disk spacer.

9. A disk separator for separating two storage disks on a spindle of a disk drive, each storage disk having two sides, the disk separator comprising:

a substantially rigid disk spacer adapted for extending between one of the sides of each of the two storage disks and maintaining the two storage disks spaced apart a fixed, disk distance on the spindle, the disk spacer being substantially annular and being adapted for substantially encircling the spindle, the disk spacer having a disk spacer outer diameter; and a substantially elastic disk damper adapted for extending between one of the sides of each of the two storage disks and dampening the level of vibration in the storage disks, the disk damper being substantially annular and being adapted for substantially encircling the spindle, the disk damper having a disk damper outer diameter which is larger than the disk spacer outer diameter of the disk spacer.

10. The disk separator of claim 9 wherein the disk damper has a disk damper height which is larger than a disk spacer height of the disk spacer and wherein the disk spacer and the disk damper are secured together.

11. The disk separator of claim 10 wherein the disk damper height is between approximately 0.003 millimeters to 0.2 millimeters larger than the disk spacer height.

12. A disk assembly for a disk drive, the disk assembly comprising:

a spindle;

a first stop attached to the spindle;

a second stop attached to the spindle;

first and second storage disks positioned around the spindle between the stops, each storage disk having two sides;

a first end separator positioned between the first stop and the first storage disk, the first end separator comprising (i) a rigid, first end spacer extending between one of the sides of the first storage disk and the first stop, the first end spacer maintaining the first storage disk spaced apart a fixed, first end distance from the first stop, and (ii) a substantially elastic first end damper which extends between one of the sides of the first storage disk and the first stop, the first end damper dampening the level of vibration in the storage disks; and a second end separator positioned between the second stop and the second storage disk, the second end separator comprising (i) a rigid, second end spacer extending between one of the sides of the second storage disk and the second stop, the second end spacer maintaining the second storage disk spaced apart a fixed, second end distance from the second stop, and (ii) a substantially elastic second end damper which extends between one of the sides of the second storage disk and the second stop, the second end damper dampening the level of vibration in the storage disks; wherein the end dampers and the end spacers are substantially annular and are substantially concentric; wherein each end damper has an end damper outer diameter which is larger than each end spacer outer diameter.

13. The disk assembly of claim 12 wherein each end damper has an end damper height which is larger than each end spacer height.

14. A disk drive comprising the disk assembly of claim 12.

15. The disk assembly of claim 12 comprising:

a disk separator comprising: (i) a disk spacer extending between one of the sides of each of the two storage disks and maintaining the two storage disks spaced apart a fixed, disk distance on the spindle; and (ii) a substantially elastic disk damper extending between one of the sides of each of the two storage disks and dampening the level of vibration in the two storage disks, the disk damper having a disk damper height which is larger than a disk spacer height of the disk spacer.

* * * * *